E. S. LAMMERS, Jr.
CONTROL SYSTEM.
APPLICATION FILED MAY 7, 1919.
1,421,261. Patented June 27, 1922.
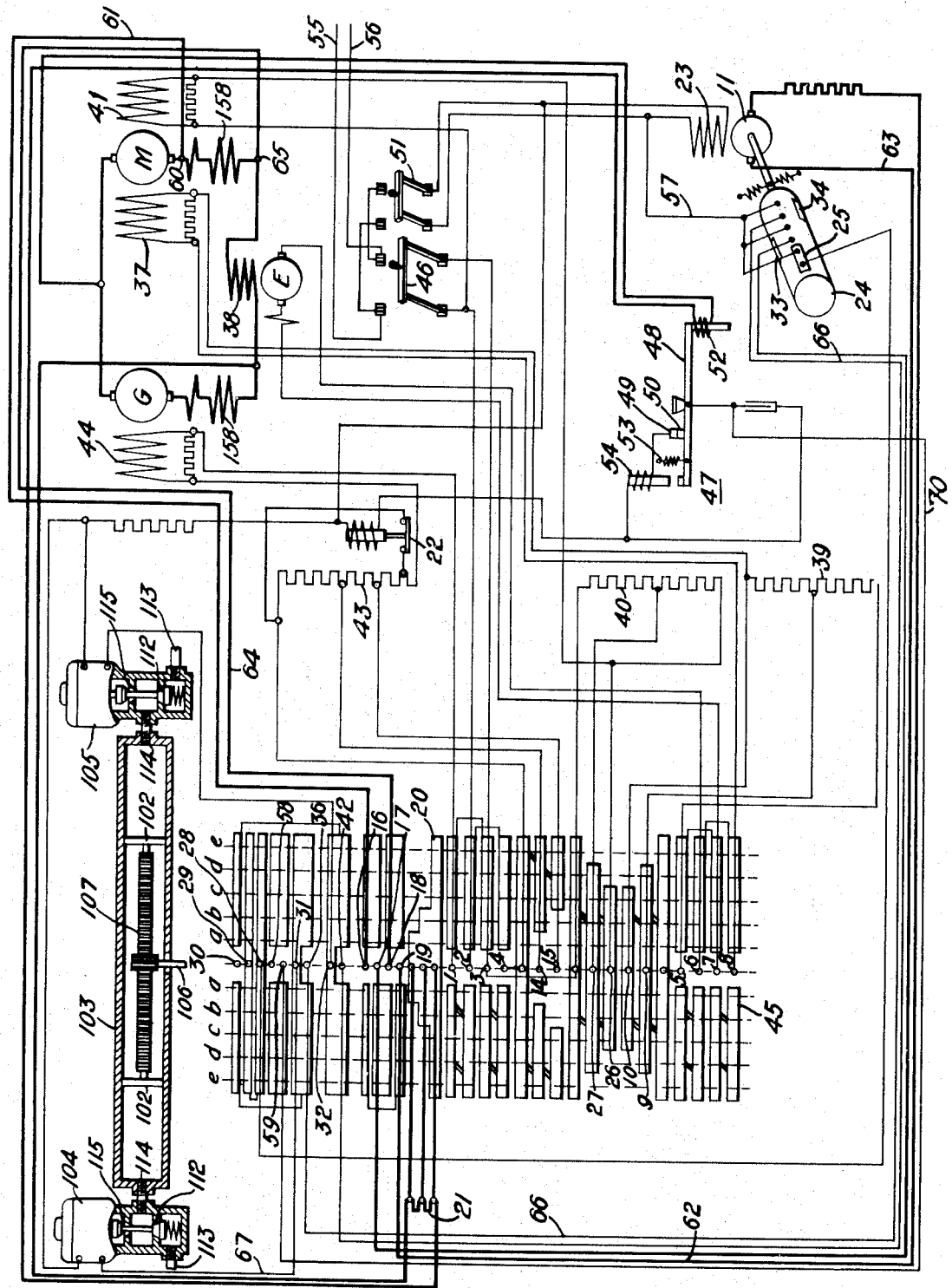
WITNESSES:
H. T. Shelhamer
David Rines
INVENTOR
Edwin S. Lammers, Jr.
BY
Wesley G. Carr
ATTORNEY

UNITED STATES PATENT OFFICE.

EDWIN S. LAMMERS, JR., OF ELYRIA, OHIO, ASSIGNOR TO WESTINGHOUSE ELECTRIC & MANUFACTURING COMPANY, A CORPORATION OF PENNSYLVANIA.

CONTROL SYSTEM.

1,421,261.   Specification of Letters Patent.   Patented June 27, 1922.

Application filed May 7, 1919. Serial No. 295,508.

*To all whom it may concern:*

Be it known that I, EDWIN S. LAMMERS, Jr., a citizen of the United States, and a resident of Elyria, in the county of Lorain and State of Ohio, have invented a new and useful Improvement in Control Systems, of which the following is a specification.

My invention relates to control systems for dynamo-electric machines and particularly to systems for forcing the field excitation of electric generators.

An object of my invention is to provide an improved control system of the above-designated character.

A second object of my invention is to provide, in such a system, a novel device for controlling the field excitation of the generator both for controlling the acceleration of a motor in circuit therewith and in accordance with the value of the current traversing the generator armature.

In such systems, the term "field-forcing" has become generally accepted to denote the process of temporarily over-exciting the generator field-magnet winding in order to accelerate the building up of the generator voltage. According to the present invention, the polarity and the degree of excitation of the generator field-magnet windings are controlled through the medium of a master controller that is connected to the source of energy through a switching device that is under the control of a torque motor. The master controller may be actuated, when the torque motor occupies one position, to effect the short-circuiting of a resistor in series with the field-magnet winding of the generator. When the current traversing the circuit of the generator armature exceeds a pre-determined value, the armature of the torque motor is energized to break the connection of the master controller to the source, so that the operation of the controller to short-circuit the resistor may be temporarily discontinued. If the current exceeds a second pre-determined value, the torque motor will effect an arrangement of circuits such that the master controller will be reversed to cause the reinsertion of part of the resistor into the generator-field circuit. The short-circuiting operation, the discontinuing of the short-circuiting operation and the reinsertion into circuit of the resistor are thus under the control of a unitary device, namely, the torque motor.

So long as the voltage of the generator is less than the value corresponding to the adjustment of the master controller, a normally closed switch effects the temporary short-circuiting of an additional portion of the resistor, so as to hasten the process of building up the generator voltage. The switch is under the control of a relay having an actuating coil that is connected, in series with a normally short-circuited resistor and across the generator armature. Portions of this resistor are adapted to be inserted into circuit with the coil simultaneously with the operation of short-circuiting portions of the generator-field resistor. The energization of the coil is thereby decreased, permitting a spring to close the relay, but, when the generator voltage builds up to a value corresponding to the position of the controller, the energization of the coil becomes great enough to open the relay, in opposition to the force of the spring, thereby opening the circuit of the actuating coil of the switch, which thereupon becomes opened. The switch thus serves to force the field of the generator at such times as the field-forcing effect is desirable.

The single figure of the accompanying drawing is a diagrammatic view of circuits and apparatus embodying my invention.

A generator G and a motor M are connected in series in a closed circuit. In order to simplify the drawing, a single generator and a single motor are illustrated. In practice, two generators and two motors are employed, their armatures being alternately disposed in the circuit. The field excitation of the generator and the motor may, in practice, be controlled by a series of electromagnetic switches for short-circuiting a resistor 43, which is normally in circuit with the generator field-magnet winding 44, and for inserting a resistor 40 into the circuit of the motor field-magnet winding 41. In order not to complicate the drawings, the resistors 43 and 40 are illustrated as directly under the control of a master controller 45.

An exciter E, which supplies current to a motor field-magnet winding 37, is provided with a field-magnet winding 38 that is in series with the armatures of the generator G and the motor M. A resistor 39, that is in series with the motor field-magnet winding 37, may, in practice, be controlled by electromagnetic switches, but is here illustrated as directly under the control of the master controller 45.

The motor field-magnet winding 41 is arranged to be connected, through a switch 46, to any suitable source of constant voltage by conductors 55 and 56. The voltage supplied to the motor field-magnet winding 37 is variable, since the voltage of the exciter E varies in accordance with the current traversing the main circuit.

The generator field-magnet winding 44 is adapted to be connected to the same source of constant voltage as the motor field-magnet winding 41, but provision is made, at contact members 1, 2, 3 and 4 of the master controller 45, for reversing the polarity of this winding. The resistor 43, which is normally under the control of contact members 14 and 15, is adapted to be short-circuited by an electromagnetic switch 22, which may be termed the generator field-forcing switch. The connection of the motor field magnet winding 37 to the terminals of the exciter E is controlled by contact members 5, 6, 7 and 8, the resistor 39 being under the control of contact members 9 and 10. The resistor 40 is under control of contact members 26 and 27.

The energization of the actuating coil of the relay 22 is under the control of a relay 47 which comprises a pivotally mounted arm 48 for effecting the engagement and the disengagement of contact members 49 and 50. The relay 47 is normally maintained closed by a spring 53 but is adapted to be opened by a coil 52 which is connected across the terminals of the armature of the generator G in series with a resistor 21, and is, therefore, responsive to generator voltage. The resistor 21 is normally short-circuited by a contact segment 20, but is adapted to be inserted into circuit with the coil 52, in increments, simultaneously with the operation of short-circuiting increments of the resistor 43. The coil 52 is thereby energized to a degree corresponding to the portion of the resistor 43 which is short-circuited. The increments of the resistor 21 are so designed that, when the generator voltage attains a value corresponding to the position of the controller 45, the coil 52 will become sufficiently energized to open the relay 47, thereby to effect the opening of the normally closed switch 22. As it takes an appreciable length of time for the generator voltage to build up to a value corresponding to the position of the controller 45, the portion of the resistor 21 which is inserted into circuit with the coil 52, simultaneously with the short-circuiting operation of portions of the resistor 43, will effect a decrease in the energization of the coil 52, so that the spring 53 will maintain the relay closed. The switch 22, therefore, will be maintained closed during the interval of time within which the generator voltage builds up to a value corresponding to the position of the controller. The switch 22, briefly stated, forces the field excitation of the generator. A coil 54 is provided, the function of which is to exert a comparatively slight pull, so that the contact members 49 and 50 shall be positively moved into engagement upon the operation of the relay. This action prevents continual sparking at the contact members, which would otherwise occur upon the energization of the coil 52 reaching a value such that the force exerted by it is substantially equal to the force of the spring 53.

For purposes of simplification, the resistors 39, 40 and 43 are shown as controlled in a small number of steps. In practice, these resistors may be controlled in a very much larger number of steps, as will be made evident, for example, upon reference to a copending application by Lum, Serial No. 97,800, filed May 16, 1916, and assigned to the same assignee as this application. The master controller 45 is, for simplicity's sake, illustrated as adapted to occupy a very small number of positions a, b, c, d and e. In practice, as many positions will be provided as will be required to control the connections of the field-magnet windings to their sources of energy and the resistors 39, 40 and 43.

The controller 45 may be automatically actuated by any power-driven mechanism, such as an air engine of the familiar PK type, or of the simpler form illustrated in the drawing. The device shown in the drawing comprises a plurality of piston stems 102 that are rigidly connected to each other and that are adapted to reciprocate in a cylinder 103 in accordance with the control exercised over them by magnet valves 104 and 105, which control the admission of fluid, under pressure, to the cylinder 103. The pistons 102 are adapted to actuate a reciprocating rack 107 for rotating a shaft 106 which is rigidly connected to the master controller 45, a development only of the controller 45 being shown in the drawings.

The magnet valves 104 and 105, of the type illustrated, are provided with fluid-inlet ducts 112, which extend from fluid-supply pipes 113 to the corresponding magnet valves 104 and 105, and a duct 114 provides a passageway from each of the magnet valves to the cylinder 103 and the pistons 102. Upon the energization of the magnet valves 104 and 105, the inlet ducts 112, which are normally closed, become opened, whereupon fluid is admitted through these ducts and through the passageways 114 to the pistons 102, fluid, at the same time, escaping to the outside air through ducts 115, which are open when the ducts 112 are closed, and vice versa.

The operation of the magnet valves 104 and 105 is under the control of a torque motor the armature 11 of which is connected, through contact members 16, 17, 18 and 19 of the master controller 45, across a reactance device 158, which is in series with the armatures of the motor M and the generator G. The reactance device 158 may be the commutating or the compensating field-magnet windings of the motor M. The shunt-field-magnet winding 23 of the torque motor is constantly energized, so that the torque motor is controlled in polarity and degree of excitation in accordance with the polarity and the degree of excitation of the main circuit comprising the motor and generator armatures. A contact drum 24, which is rigidly rotatable with the armature 11 of the torque motor, is supplied with a contact member 25, which controls the energization of the energizing coils of the magnet valves 104 and 105, through contact members 28, 29, 30, 31 and 32 of the master controller 45. The contact member 25 is normally closed when the torque motor occupies its initial central position. Obviously, if the current traversing the main circuit of the motor and generator armatures exceeds a predetermined value, the torque motor will be energized sufficiently to break the circuit controlled by the contact member 25. When the current traversing the main armature circuit rises to a still greater value, contact segments 33 and 34 are adapted, according to the direction of rotation of the torque motor, to close circuits, through contact members 36 and 42 of the master controller 45, for energizing the coils of the magnet valves 104 and 105 to effect a reversal in the operation of the master controller 45. The torque motor cannot be actuated more than 90° in either direction of rotation. It will thus be evident that, so long as the torque motor occupies its normal position, the master controller 45 will be actuated to control the motor M and the generator G according to a predetermined, desired manner, but when the current traversing the motor-generator set exceeds a predetermined value, the operation of the master controller 45 will be discontinued and when the current exceeds a second and larger value, the master controller 45 will be reversed.

The contact members 29 and 30, which are electrically connected to each other, are adapted to be bodily moved from their illustrated, or "off," position, in either direction, to any one of the positions marked a, b, c, d and e, whereupon circuits will be closed, as described below, for effecting the actuation of the master controller 45 in either direction, as desired.

The field-magnet windings of the motor M and the generator G are adapted to be connected to the source of constant voltage by control switches 46 and 51, which are adapted to respectively close the main and the control circuits of the generator G and the motor M.

Assuming that the contact members 29 and 30 occupy their illustrated, or inoperative, positions, and that the control switches 46 and 51 are closed, the motor field-magnet winding 41 will be energized by a circuit extending from the line conductor 55, through the switch 46, the field-magnet winding 41, the contact members 26, 27 and 3, and the switch 46, to the line conductor 56. It will be noted that the resistor 40 is thus normally short-circuited. The voltage of the generator G, though the generator is mechanically driven, is substantially zero, since the field-magnet winding 44 is not energized. The motor field-magnet winding 37 is also de-energized. The switch 22 may be closed (assuming the contact members 58 and 59 to be bridged by the controller 45) by means of a circuit extending from the line conductor 55, through the switch 51, by way of a conductor 57, through the contact member 25, contact members 28, 58 and 59, by way of a conductor 70, through the contact members 50 and 49, the coil 54, the actuating coil of the switch 22 and the switch 51, to the line conductor 56. The switch 22 may thus maintain the major portion of the resistor 43 short-circuited. In the "off" position of the controller 45, however, the contact members 58 and 59 are not bridged, and the circuit of the actuating coil of the switch 22 is open.

Assuming that it is desired to start the system for operation of the motor in the one or the other direction, the contact members 29 and 30 may be bodily actuated to any one of the positions a, b, c, d and e, in either direction; it may be assumed that they are moved to the position e, toward the right. A circuit will thereupon be established from the line conductor 55, through the switch 51, by way of the conductor 57, through the contact members 25, 28, 29, 30 and 32, the actuating coil of the magnet valve 105 and the switch 51, to the line conductor 56. The actuating coil of the magnet valve 105 will thereupon become energized to effect the opening of the duct 112 and the closing of the duct 115 of the magnet valve 105. Fluid will thereupon be admitted through the ducts 113, 112 and 114, to the right-hand portion of the chamber 103, to exert a pressure upon the right-hand piston 102, whereupon the rack 107 will be actuated to the left, to cause rotation of the shaft 106 toward the right, and the consequent actuation of the drum 45 toward the right. Fluid will escape from the left-hand portion of the chamber 103, through the valve 115 of the magnet valve 104, to the outside air.

When the drum occupies the left-hand position $a$, and the contact members 29 and 30 the right-hand position $d$, a circuit will be established from the conductor 55, through the switch 46, the contact members 1 and 2, which are bridged by the master controller 45, the field-magnet winding 44, the switch 22, the contact members 4 and 3, which are bridged by the master controller 45, and the switch 46, to the line conductor 56. The switch 22, of course, is closed by the circuit, above traced, for its actuating coil when the controller 45 occupies any but the "off" position. The generator field-magnet winding 44 is thereby energized through that portion of the resistor 43 that is not shunted by the switch 22. A circuit is also established from one terminal of the armature of the exciter E, through the contact members 7 and 8, which are bridged by the master controller 45, the motor field-magnet winding 37, the contact members 10, 9, 5 and 6, the latter two of which are bridged by the master controller 45, to the other terminal of the exciter E. The field-magnet winding 37 is thus connected to the exciter E, the resistor 39 being, at this time, short-circuited by the master controller 45.

When the generator G builds up to a voltage corresponding to the position $a$ of the master controller 45, the coil 52 will become energized to a degree sufficient to cause the opening of the contact members 49 and 50 of the relay 47, thereby effecting the opening of the circuit of the actuating coil of the switch 22, which will drop open by gravity. The resistor 43 is thus temporarily short-circuited by the switch 22 to hasten the building up of the generator voltage to a value corresponding to the position $a$ of the master controller 45.

When the master controller 45 occupies the position $b$, a portion of the resistor 21 will be inserted into circuit with the coil 52 by the contact segment 20 of the master controller 45, thereby weakening the energization of the coil 52 and permitting the spring 53 to close, again, the contact members 49 and 50 of the relay 47. The switch 22 will thereby become closed again to short-circuit the major portion of the resistor 43. In the position $b$, also, a portion of the resistor 43 will become short-circuited by the contact member 14. When, therefore, the generator voltage builds up to a value corresponding to the position $b$ of the master controller 45, the coil 52 will again become energized sufficiently to effect a reopening of the relay 47 and the consequent reopening of the switch 22, whereupon the generator G will remain energized to a degree corresponding to the position $b$ of the master controller 45, that is, to a degree such that a portion only of the resistor 43 is in circuit with the field-magnet winding 44.

In the position $c$ of the master controller 45, an additional portion of the resistor 21 will be inserted into circuit with the coil 52 to reduce the energization of this coil and to cause the consequent closing of the relay 47 and, therefore, of the switch 22, and a portion of the resistor 43 will become short-circuited by the contact member 15. The switch 22 is effective in position $c$ of the controller 45 because a portion of the resistor 43 is permanently in circuit. In this manner, the resistor 43 may be short-circuited, in as many steps as desired, to cause the gradual increased excitation of the field-magnet winding 44, and the switch 22 will flutter to temporarily increase the excitation of the field-magnet winding 44 until such time as the generator voltage builds up to values corresponding to the positions of the master controller 45. Obviously, if the fluid pressure is sufficiently great, and the load upon the motor M sufficiently light, the master controller 45 may be actuated at such speed that the relay 22 will remain closed throughout the accelerating operation, or the speed of the master controller 45 may be slow enough to permit the generator voltage periodically building up to such values that the relay 22 will periodically become reopened and reclosed, to accord with the voltage of the generator reaching values corresponding to positions of the master controller 45.

When the master controller 45 occupies the position $d$, portions of the resistors 39 and 40 will be respectively inserted into circuit with the field-magnet windings 37 and 41, in order to further increase the motor speed. When the master controller 45 occupies the position $e$, additional portions of these resistors will become inserted into circuit with their field-magnet windings. The resistors 39 and 40 may be inserted into circuit in as many steps as may be desired, as illustrated, for example, in the above-mentioned application by Lum, two steps being shown here for purposes of illustration.

By means of this arrangement, the field-excitation of the generator is first increased and that of the motor is later decreased in order to bring the motor up to normal speed. In order to save time, the field excitation of the generator is forced by means of the switch 22, which is under the control of the relay 47. In this manner, the motor speed may be quickly attained in as short a time as is consistent with desirable operating conditions.

If, during the acceleration of the motor, the current traversing the circuit of the armatures of the generator G and the motor M exceeds a predetermined value, the armature 11 of the torque motor becomes excessively energized by the circuit extending from a junction 60, at one terminal of the reactance device 158, by way of a conductor 61, through the contact members 16 and 19, which are bridged by the master controller 45, by way of a conductor 62, through the armature 11 of the torque motor, by way of a conductor 63, and through contact members 17 and 18, which are bridged by the master controller 45, by way of a conductor 64, to a junction 65 at the opposite terminal of the reactance device 58.

The circuit of the actuating coil of the magnet valve 105 becomes thereupon broken at the contact segment 25. The master controller 45 will thereupon be stopped in the position which it then happens to occupy to prevent further accelerating operation. As soon as the current falls again to a normal value, the torque motor will be returned to its initial position, and the contact member 25 will again close the circuit of the actuating coil of the magnet valve 105.

Should the current traversing the circuit of the armatures, however, exceed a second and higher predetermined value, the armature 11 of the torque motor will be rotated through 90°, so as to permit the completion of a circuit by the contact member 34. This circuit will extend from the line conductor 55, through the switch 51, by way of the conductor 57, through the contact member 34, by way of a conductor 66, through the contact members 36 and 31, by a conductor 67 and through the actuating coil of the magnet valve 104 and the switch 51, to the line conductor 56. The magnet valve 104 will thereupon be operated to permit fluid pressure in the left-hand portion of the cylinder 103, to cause a reversal of the operation, heretofore described, of the master controller 45, thereby to effect a decrease in the voltage of the generator until such time as the current traversing the armature circuit of the motor M and the generator G falls below the value for which the torque motor is designed to be actuated, as above described. As soon as contact is broken at the contact member 34, the master controller 45 will again be stopped in the position which it happens to occupy at the time, and, when the current traversing the main circuit falls to a safe value, the contact segment 25 will again close the circuit of the actuating coil of the magnet valve 105, in order to effect the continued operation of the master controller 45 to the position e.

When the master controller 45 occupies its final position e, the circuit of the actuating coil of the magnet valve 105 will obviously be broken at the contact member 30, and the motor will continue to run at its normal speed.

If the contact members 29 and 30 had been actuated to any intermediate position, the operation of the controller 45 would have been stopped when the controller 45 reached that intermediate position. The motor-generator set may, therefore, be accelerated to normal speed or to any intermediate speed. Furthermore, if desired, the contact segments of the master controller 45 may be so designed that, instead of first effecting the short-circuiting of the resistor 43 and then the insertion of the resistors 39 and 40 into circuit, increments of the resistor 43 and the resistors 39 and 40 may be alternately operated upon, which might be a desirable arrangement under conditions where it is thought best to operate the motor at some speed below that of normal speed.

When it is desired to stop the motor or to decrease its speed, the contact members 29 and 30 may be bodily actuated toward the ultimate position to the left, or to any intermediate position, as desired. The motor will then operate as a generator, when the electromotive force generated by it exceeds the generator voltage. The circuit of the actuating coil of the magnet valve 104 will become closed by the contact member 25 through the contact members 28, 29, 30 and 31, to effect the operation of the master controller 45 toward the left. The resistors 39 and 40 will become short-circuited and the resistor 43 inserted into circuit in a manner substantially the reverse of that described above in connection with the description of the accelerating operation. The switch 22 should remain open during the decelerating operation, because of the high value of the current flowing in the main circuit and, therefore, in the coil 52, but it will flutter in accordance with the value of this current if the current fluctuates. The controller 45 will be stopped in the position which it may happen to occupy, or reversed, in accordance with whether the torque motor is operated sufficiently to break the circuit controlled by the contact member 25, or to make the circuit controlled by the contact member 33 for the actuating coil of the magnet valve 105. The torque motor, of course, will operate in the reverse direction to that described above, because the current now traverses the main circuit in the opposite direction, thereby effecting a reversal of the current traversing the armature 11 of the torque motor while the field-magnet winding 43 of the torque motor remains constantly energized, as before.

During acceleration, the generator voltage is intermittently of lower value with respect to the portion of the resistor 21 which is in circuit with the coil 51. During deceleration, on the other hand, the generator voltage is intermittently of higher value. During deceleration, therefore, the switch 22 remains open; but the coil would not open during acceleration, were it not that the circuit of the actuating coil of the switch 22 is adapted to be opened at the contact member 25 upon the occurrence of overload conditions. There is thus an advantage in connecting the actuating coil of the switch 22 to the contact member 25 over a direct connection to the switch 51.

The motor may be operated in the reverse direction upon the contact members 29 and 30 being actuated from their initial, illustrated position to any of the five positions to the left. The operation will be substantially the same as that above described in connection with the forward operation of the motor, the chief difference residing in that the magnet valve 104 will function to operate the master controller 45 in a direction the reverse of that caused by the valve 105 during forward operation.

My invention is particularly applicable to field-forcing systems, the resistors of which are controlled directly by drum controllers or controllers of the cam-operated type, instead of through electromagnetic switches. The introduction of the resistor 21 in circuit with the coil 52 and the provision for short-circuiting suitably valued portions of this resistor simultaneously with the short-circuiting of portions of the resistor 43 is a feature particularly valuable in connection with such controllers.

In the above-mentioned application by Lum, a plurality of relays are employed to maintain the current traversing the main circuit within predetermined limits. By the provision of a torque motor, in the manner illustrated and described in this application, the use of a plurality of relays is done away with. My system is therefore simpler and cheaper.

While I have illustrated and described one practical form which my invention may assume, I desire it to be understood that my invention is of broader scope than the illustrated embodiment thereof, and I desire, therefore, that the appended claims shall be construed broadly, except in so far as limitations may be specifically imposed therein.

I claim as my invention:

1. The combination with an electric generator having a resistor in the field-magnet circuit thereof, of means for gradually shunting said resistor, means for intermittently shunting said resistor in accordance with the relation of the actual generator voltage to the voltage for which the first means has been adjusted, and means comprising a torque motor for controlling said first means in accordance with the value and the direction of the current traversing said generator.

2. The combination with an electric generator having a field-magnet winding and a resistor in circuit therewith, of a power-operated device for gradually shunting said resistor, manually-operable means for controlling said power device, and means comprising a torque motor that is controlled in accordance with the value and the direction of the current traversing the generator circuit for limiting the operation of, or reversing the direction of operation of, said power device.

3. An electrical system comprising a generator, a resistor in the field-magnet circuit thereof and means for short-circuiting a portion of said resistor to produce a desired generator voltage, of means for automatically short-circuiting an additional portion of said resistor when the generator voltage differs substantially from that desired, and means for rendering said automatic short-circuiting means ineffective when the generator voltage reaches the desired value, said last-named means comprising an energizing coil connected across the armature of said generator and means for varying the energizing effect of said coil in accordance with the desired value of the voltage of said generator for which said short-circuiting means is adjusted.

4. An electrical system comprising a generator, a resistor in the field-magnet circuit thereof and means for short-circuiting a portion of said resistor to produce a desired generator voltage, of means for controlling an additional portion of said resistor when the generator voltage differs substantially from that desired, said controlling means comprising an energizing coil and a resistor connected in series therewith, and means for varying the effective value of said second-named resistor in accordance with the desired value of the voltage of said generator for which said short-circuiting means is adjusted.

5. An electrical system comprising a generator, a resistor in the field-magnet thereof and a controller for progressively short-circuiting said resistor, of a switch for short-circuiting substantially the whole of said resistor when the voltage of said generator is less than the normal voltage corresponding to the position of said controller, a relay for controlling said switch and having an actuating coil connected across the armature of said generator, a normally short-circuited resistor in series with said coil and means for progressively inserting said second-named resistor into circuit with said coil simultaneously with the short-circuiting of said first-named resistor by said controller.

6. The combination with a dynamo-electric machine, a controller therefor having an adjustable member for controlling the limits of movement of said controller and means for actuating said controller, of a normally closed switch for controlling the normal operation of said actuating means, a normally open switch for reversing the operation of said actuating means and a torque motor which is normally operative to maintain said normally closed switch closed and which is responsive to the value of the current traversing said machine for opening said normally closed switch to stop the operation of said actuating means and for closing said normally open switch to reverse the operation of said actuating means.

In testimony whereof, I have hereunto subscribed my name this 25th day of April, 1919.

EDWIN S. LAMMERS, Jr.